US012570197B2

(12) United States Patent (10) Patent No.: US 12,570,197 B2
Ito (45) Date of Patent: Mar. 10, 2026

(54) IN-VEHICLE CONVERSATION DEVICE

(71) Applicant: ALPS ALPINE CO., LTD., Tokyo (JP)

(72) Inventor: Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 137 days.

(21) Appl. No.: 18/624,560

(22) Filed: Apr. 2, 2024

(65) Prior Publication Data

US 2024/0336181 A1 Oct. 10, 2024

(30) Foreign Application Priority Data

Apr. 7, 2023 (JP) ................................. 2023-062872

(51) Int. Cl.
B60N 2/879 (2018.01)
B60N 2/00 (2006.01)
H04R 3/00 (2006.01)
H04R 5/02 (2006.01)

(52) U.S. Cl.
CPC ............. B60N 2/879 (2018.02); B60N 2/002 (2013.01); H04R 3/005 (2013.01); H04R 5/023 (2013.01); H04R 2499/13 (2013.01)

(58) Field of Classification Search
CPC .......... B60N 2/879; B60N 2/002; B60N 2/00; H04R 3/005; H04R 5/023; H04R 2499/13; H04R 27/00; H04R 3/12; H04R 3/00; H04R 5/02; H04S 7/303; H04S 7/308; H04S 2400/11; G10L 21/0316
See application file for complete search history.

(56) References Cited

U.S. PATENT DOCUMENTS

2021/0306742 A1* 9/2021 Saito ......................... H04R 3/00

FOREIGN PATENT DOCUMENTS

| JP | 2007281534 | * 10/2007 | ............ B60R 11/02 |
| JP | 2008-120262 | 5/2008 | |
| JP | 4232617 | 3/2009 | |

OTHER PUBLICATIONS

Extended European Search Report for 24168013.1 mailed on Sep. 20, 2024.

* cited by examiner

*Primary Examiner* — Yosef K Laekemariam
(74) *Attorney, Agent, or Firm* — IPUSA, PLLC

(57) ABSTRACT

An in-vehicle conversation device amplifies a sound of a passenger collected by a front row microphone by a front row sound amplifier and outputs the sound from speakers and provided more outward than a head position of a passenger of a back row seat relative to the microphone, amplifies a sound of a passenger collected by a back row microphone by a back row sound amplifier and outputs the sound from speakers and provided more outward than a head position of a passenger of a front row seat relative to the microphone.

3 Claims, 3 Drawing Sheets

IN-VEHICLE CONVERSATION DEVICE

CROSS-REFERENCE TO RELATED APPLICATIONS

This application is based upon and claims priority to Japanese Patent Application No. 2023-062872, filed on Apr. 7, 2023, the entire contents of which are incorporated herein by reference.

BACKGROUND OF THE INVENTION

1. Field of the Invention

The present disclosure relates to an in-vehicle conversation device in which passengers seated in the front and back seats of a vehicle converse with each other.

2. Description of the Related Art

Conventionally, an in-vehicle communication device having a microphone arranged on each seat in a vehicle compartment and at least one speaker, which establishes a communication path between the seats after determining an empty seat status of each seat, and enables a communication between the passengers (see, for example, Japanese Laid-Open Patent Publication No. 2008-120262).

In the in-vehicle communication device disclosed in Japanese Laid-Open Patent Publication No. 2008-120262, when the microphone collects the utterance of the passenger output from the speaker along with the utterance of the passenger, howling and echoes occur, making it difficult to hear what is being said and hindering smooth conversation.

SUMMARY OF THE INVENTION

One object according to an aspect of the present disclosure is to provide an in-vehicle conversation device capable of improving the audibility of what is being said.

According to an aspect of the present disclosure, an in-vehicle conversation device is for a conversation between a passenger in one of a plurality of front row seats and a passenger in one of a plurality of back row seats in a vehicle in which a plurality of rows of seats are arranged along a moving direction of the vehicle. The front row seats include a front row left seat and a front row right seat, and the back row seats include a back row left seat and a back row right seat. The in-vehicle conversation device includes: a front row sound collector provided at a position that is in front of and between the front row left seat and the front row right seat, and is configured to collect a sound uttered by the passenger in the one of the front row seats; a back row sound collector provided at a position that is in front of and between the back row left seat and the back row right seat, and is configured to collect a sound uttered by the passenger in the one of the back row seats; a front row left seat speaker provided in or near a headrest of the front row left seat and more outward than a head position of a passenger in the front row left seat relative to the front row sound collector; a front row right seat speaker provided in or near a headrest of the front row right seat and more outward than a head position of a passenger in the front row right seat relative to the front row sound collector; a back row left seat speaker provided in or near a headrest of the back row left seat and more outward than a head position of a passenger in the back row left seat relative to the back row sound collector; a back row right seat speaker provided in or near a headrest of the back row right seat and more outward than a head position of a passenger in the back row right seat relative to the back row sound collector; a front row sound amplifier configured to amplify the sound collected by the front row sound collector and to output an amplified sound from the back row left seat speaker and from the back row right seat speaker; and a back row sound amplifier configured to amplify the sound collected by the back row sound collector and to output an amplified sound from the front row left seat speaker and from the front row right seat speaker.

Because the collected sound of the passenger is output from a speaker located far from the sound collector, howling and echoes can be minimized by reducing the amount of the collected sound being collected again by the sound collector via the speaker. Therefore, it is possible to remedy the difficulty in hearing what is being said and to achieve a smooth conversation.

It is preferable that the in-vehicle conversation device further includes: a passenger detector configured to detect presence or absence of a passenger in each seat of the front row seats and the back row seats; and an output stop controller configured to stop a sound output to one or more speakers among the front row left seat speaker, the front row right seat speaker, the back row left seat speaker, and the back row right seat speaker, the one or more speakers corresponding to seats in which no passenger is detected to be present by the passenger detector. Accordingly, direct propagation of the sound that is output from the speaker and collected by the microphone otherwise causing howling and echoes can be blocked by the head of the passenger. Therefore, it is possible to further remedy the difficulty in hearing what is being said.

It is preferable that the in-vehicle conversation device further includes an inner speaker provided in or near a headrest of each seat of the front row seats and the back row seats, more inward than a head position of a passenger relative to the front row sound collector or the rear row sound collector, in addition to an outer speaker including the front row left seat speaker, the front row right seat speaker, the back row left seat speaker, and the back row right seat speaker. It is preferable that a sound output corresponding to a sound collected by the front row sound collector and the back row sound collector is performed using only the outer speaker, and a sound output for other purposes is performed using both the outer speaker and the inner speaker. In a case where a speaker provided for other purposes such as audio reproduction, video reproduction, and receiver audio output is used for a conversation output of the passengers, by selectively using a speaker that generates less howling or echoes, it is possible to effectively remedy the difficulty in hearing what is being said.

DESCRIPTION OF THE PREFERRED EMBODIMENTS

Hereinafter, an in-vehicle conversation device according to an embodiment to which the present invention is applied will be described with reference to the drawings.

Figure 1:
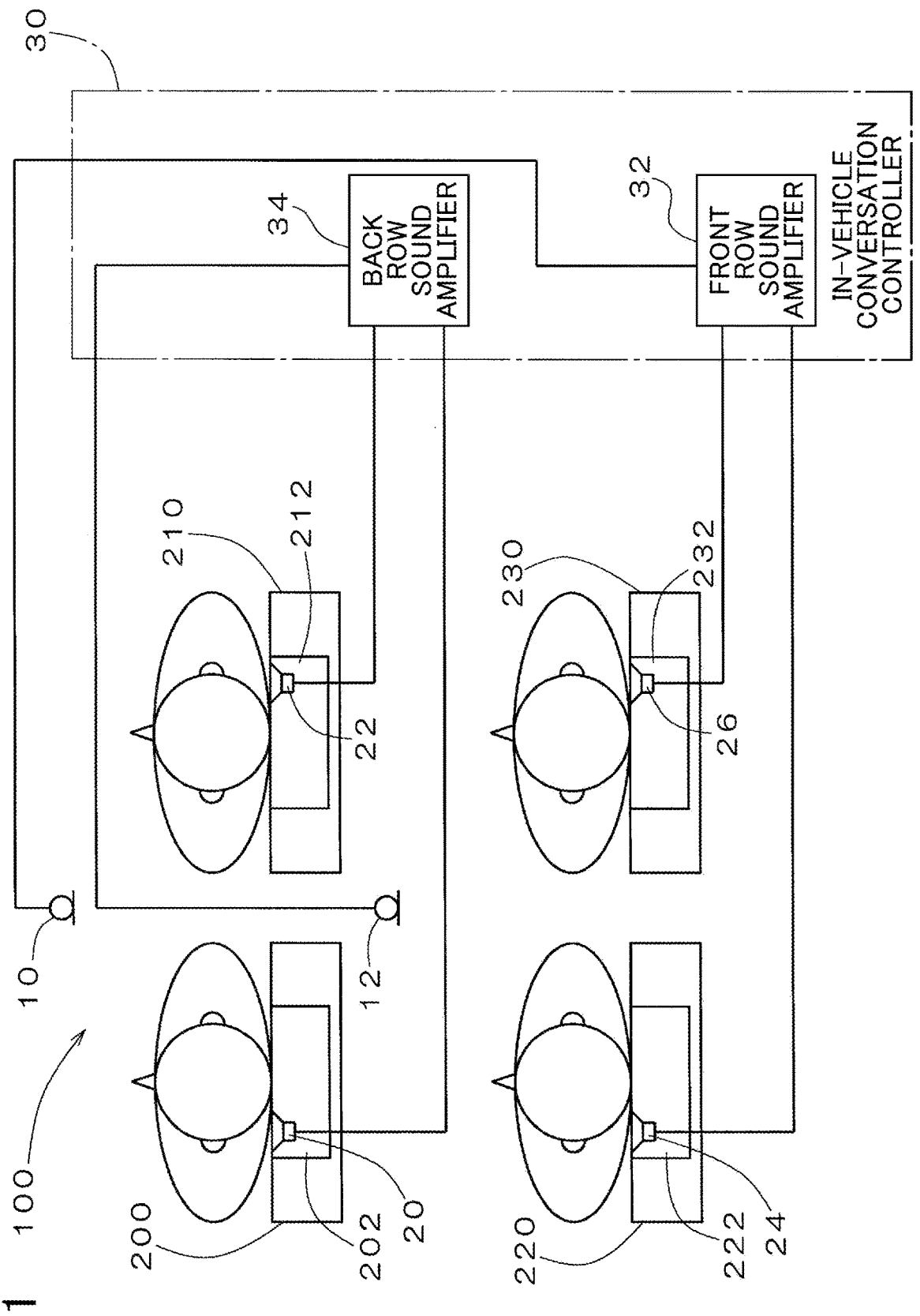
FIG. 1 is a diagram illustrating a configuration of an in-vehicle conversation device according to an embodiment.

FIG. 1 is a diagram illustrating a configuration of an in-vehicle conversation device according to an embodiment. As illustrated in FIG. 1, an in-vehicle conversation device 100 of the present embodiment is for a conversation, in a vehicle in which a plurality of rows of seats (for example, a front row and a back row) are arranged along the moving direction of the vehicle, between passengers in the front row seats and passengers in the back row seats, and includes two microphones 10 and 12, four speakers 20, 22, 24, and 26, and an in-vehicle conversation controller 30. The microphone 10 corresponds to a front row sound collector, and the microphone 12 corresponds to a back row sound collector.

The front row seats include a front row left seat 200 and a front row right seat 210. The back row seats include a back row left seat 220 and a back row right seat 230.

The microphone 10 is provided at a position that is in front of and between the front row left seat 200 and the front row right seat 210, and collects the sound produced by the passengers of the front row seats. The microphone 12 is provided at a position that is in front of and between the back row left seat 220 and the back row right seat 230, and collects the sound produced by the passengers of the back row seats.

The speaker 20 is provided in or near a headrest 202 of the front row left seat 200 and more outward than the head position of the passenger in the front row left seat 200 relative to the microphone 10 (on the left side toward the front of the vehicle). The speaker 22 is provided in or near a headrest 212 of the front row right seat 210 and more outward than the head position of the passenger in the front row right seat 210 relative to the microphone 10 (on the right side toward the front of the vehicle). The speaker 24 is provided in or near a headrest 222 of the back row left seat 220 and more outward than the head position of the passenger in the back row left seat 220 relative to the microphone 12 (on the left side toward the front of the vehicle). The speaker 26 is provided in or near a headrest 232 of the back row right seat 230 and more outward than the head position of the passenger in the back row right seat 230 relative to the microphone 12 (on the right side toward the front of the vehicle).

The in-vehicle conversation controller 30 amplifies the sound of each passenger collected by the microphones 10 and 12 and selectively outputs the sound from the speakers 20, 22, 24, and 26. For this purpose, the in-vehicle conversation controller 30 includes a front row sound amplifier 32 and a back row sound amplifier 34.

The front row sound amplifier 32 amplifies the sound of the passenger in the front row seat collected by the microphone 10 and outputs the sound from the back row left seat speaker 24 and from the back row right seat speaker 26. The back row sound amplifier 34 amplifies the sound of the passenger in the back row seat collected by the microphone 12 and outputs the sound from the front row left seat speaker 20 and from the front row right seat speaker 22.

As described above, in the in-vehicle conversation device 100 of the present embodiment, the sound of the passenger in the front row seat collected by the microphone 10 in the front row is output from the speakers 24 and 26 located farther from the microphone 10 than the head of the passenger, and the sound of the passenger in the back row seat collected by the microphone 12 in the back row is output from the speakers 20 and 22 located farther from the microphone 12 than the head of the passenger. Thus, howling and echoes can be minimized by reducing the amount of the collected sound being collected again by the microphones 10 and 12 via the speakers 20, 22, 24, and 26.

Therefore, it is possible to remedy the difficulty in hearing what is being said and to achieve a smooth conversation.

Figure 2:
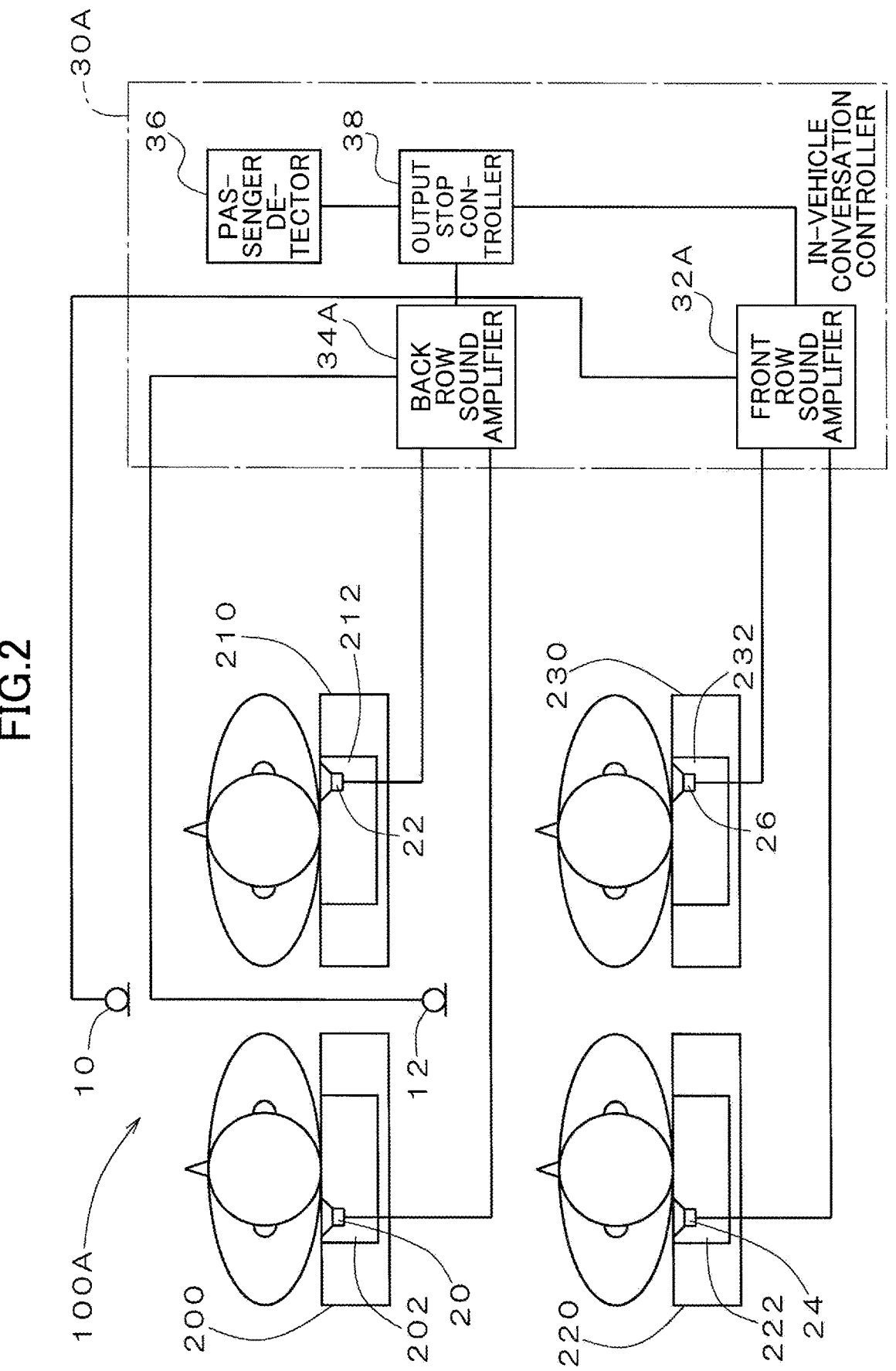
FIG. 2 is a diagram illustrating a configuration of an in-vehicle conversation device according to a variation.

FIG. 2 is a diagram illustrating a configuration of an in-vehicle conversation device according to a variation. An in-vehicle conversation device 100A of the variation illustrated in FIG. 2 differs in that the in-vehicle conversation controller 30 of the in-vehicle conversation device 100 illustrated in FIG. 1 is replaced with an in-vehicle conversation controller 30A.

The in-vehicle conversation controller 30A includes a front row sound amplifier 32A, a back row sound amplifier 34A, a passenger detector 36, and an output stop controller 38.

The passenger detector 36 detects presence or absence of a passenger in each seat of the front row seats and the back row seats. For detection methods, various methods are considered. For example, in a typical vehicle, the detection is performed based on a weight sensor provided on a seating surface of each seat and based on whether a seat belt is fastened or not. Specifically, it is detected that a passenger is in the seat when an object heavier than a predetermined value is on the seat and the seat belt is fastened. Alternatively, a camera is used to capture images around a backrest and a headrest of each seat, and when the obtained image includes an image of an upper body including a head of a passenger, it is detected that a passenger is in the seat. Alternatively, each passenger may operate a control unit provided near each seat, and it is detected that a passenger is in the seat based on the content of that operation.

The output stop controller 38 instructs the speaker provided in the seat where the passenger is not detected by the passenger detector 36 to stop the output of the conversation sound.

The front row sound amplifier 32A amplifies the sound of the passenger in the front row seat collected by the microphone 10 and outputs the amplified sound from the back row left seat speaker 24 and from the back row right seat speaker 26 for the seat where the output stop is not instructed by the output stop controller 38. Therefore, when there is a passenger only in the back row left seat 220 and no passenger in the back row right seat 230, the conversation sound is output from the speaker 24 only and not from the speaker 26. In contrast, when there is a passenger only in the back row right seat 230 and no passenger in the back row left seat 220, the conversation sound is output from the speaker 26 only and not from the speaker 24.

The back row sound amplifier 34A amplifies the sound of the passenger of the back row seat collected by the microphone 12 and outputs the amplified sound from the front row left seat speaker 20 and from the front row right seat speaker 22 for the seat where the output stop is not instructed by the output stop controller 38. Therefore, when there is a passenger only in the front row right seat 210 and no passenger in the front row left seat 200, the conversation sound is output from the speaker 22 only and not from the speaker 20.

As described above, in the in-vehicle conversation device 100A of the present embodiment, the conversation sound is not output from the speaker in the seat where no passenger is present, and the conversation sound is output from the speaker only when there is an passenger. Accordingly, direct propagation of the sound that is output from the speaker and collected by the microphones 10 and 12 otherwise causing howling and echoes can be blocked by the head of the passenger. Therefore, it is possible to further remedy the difficulty in hearing what is being said.

Figure 3:
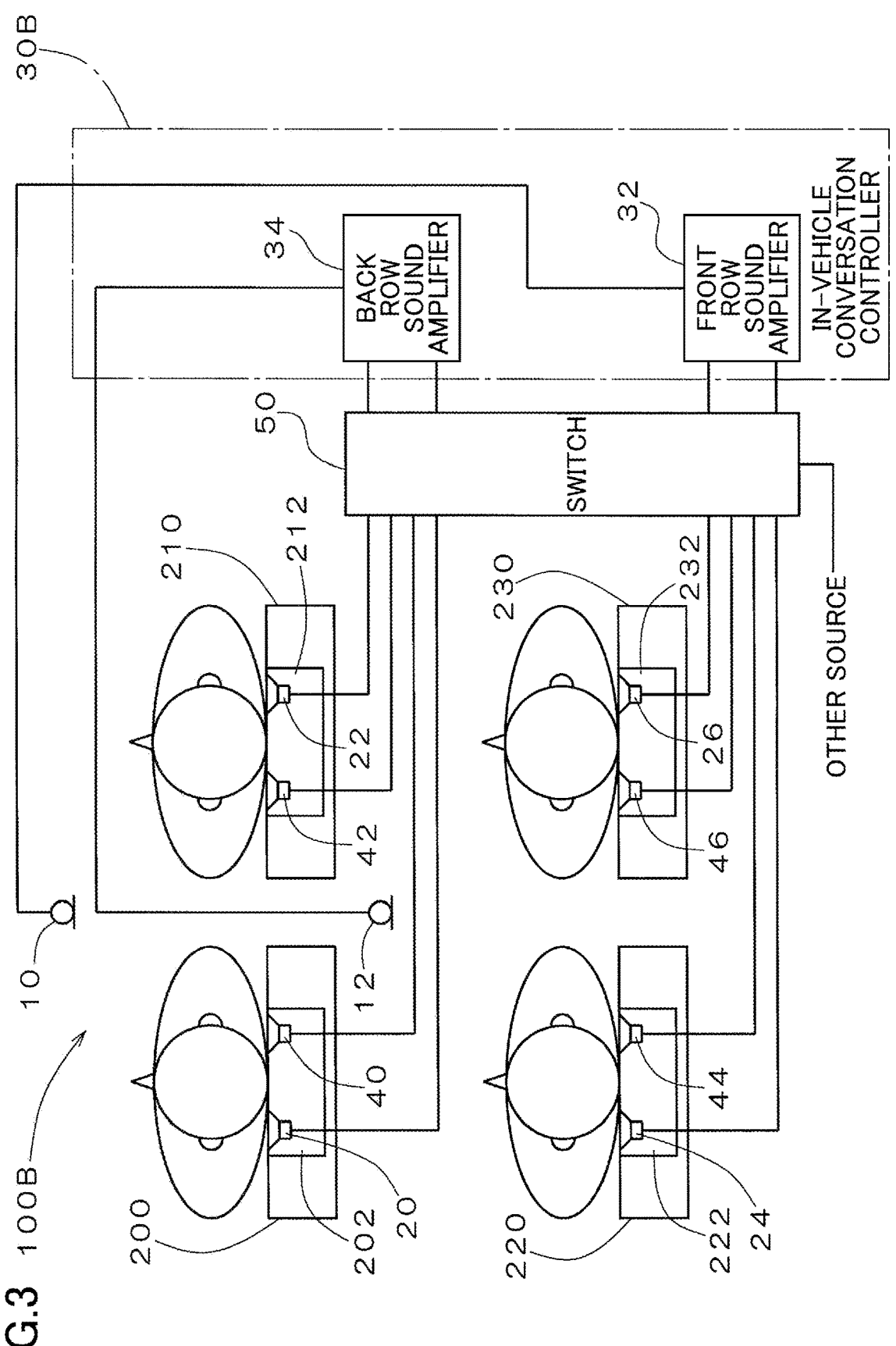
FIG. 3 is a diagram illustrating a configuration of an in-vehicle conversation device according to another variation.

FIG. 3 is a diagram illustrating a configuration of the in-vehicle conversation device according to another variation. An in-vehicle conversation device 100B of the variation illustrated in FIG. 3 is different from the in-vehicle conversation device 100 illustrated in FIG. 1 (it may be the in-vehicle conversation device 100A illustrated in FIG. 2) in that four speakers 40, 42, 44, 46 and a switch 50 are added. The four speakers 20, 22, 24, 26 correspond to outer speakers, and the four speakers 40, 42, 44, 46 correspond to inner speakers.

The speaker 40 is provided in or near the headrest 202 of the front left seat 200 and more inward than (to the right toward the front of the vehicle) the head position of the passenger of the front left seat 200 relative to the microphone 10. The speaker 42 is provided in or near the headrest 212 of the front right seat 210 and more inward than (to the left toward the front of the vehicle) the head position of the passenger of the front right seat 210 relative to the microphone 10. The speaker 44 is provided in or near the headrest 222 of the back left seat 220 and more inward than (to the right toward the front of the vehicle) the head position of the passenger of the back left seat 220 relative to the microphone 12. The speaker 46 is provided in or near the headrest 232 of the back right seat 230 and more inward than (to the left toward the front of the vehicle) the head position of the passenger of the back right seat 230 relative to the microphone 12.

The switching section 50 switches the combination of the source of the output sound and the speaker. Specifically, when the in-vehicle conversation control section 30 is used as the source of the output sound, the in-vehicle conversation control section 30 and the speaker 20 to 26 are connected. With this connection, the conversation sound output from the in-vehicle conversation control section 30 is output from the speaker 20 to 26. When other sources such as devices for audio reproduction, video reproduction, and the like, radio broadcast receivers, and television broadcast receivers are used as the source of the output sound, these devices are connected to the speakers 20 to 26 and 40 to 46. With this connection, the sound (audio output) output from the audio reproducing device, and the like is output from the speakers (for example, speaker 20 and speaker 40) on the left and right sides of each passenger.

As described above, in the in-vehicle conversation device 100B of this variation, when the speakers 20 to 26 and 40 to 46 provided for other applications such as audio reproduction, video reproduction, and receiver audio output are used for the conversation output of a passenger, it is possible to effectively remedy the difficulty in hearing what is being said by selectively using a speaker among the speakers 20 to 26 which generates less howling and echo.

The present invention is not limited to the above embodiments, and various modifications can be performed within the scope of the gist of the present invention. The in-vehicle conversation devices 100, 100A, and 100B illustrated in the above embodiments and modifications may be incorporated into a device such as a head unit in the in-vehicle. In the in-vehicle conversation device 100B of the modification illustrated in FIG. 3, a switch 50 is provided separately from the in-vehicle conversation controller 30, but a switch 50 may be provided in the in-vehicle conversation controller 30.

As described above, according to the present invention, because the sound of the passenger who has collected the sound is output from a speaker arranged far from the sound collector, the degree to which the collected sound is collected by the sound collector again via the speaker can be reduced to suppress the generation of howling and echo, and therefore, it is possible to remedy the difficulty in hearing what is being said and realize a smooth conversation.

What is claimed is:

1. An in-vehicle conversation device for a conversation between a passenger in one of a plurality of front row seats and a passenger in one of a plurality of back row seats in a vehicle in which a plurality of rows of seats are arranged along a moving direction of the vehicle, wherein the plurality of front row seats include a front row left seat and a front row right seat, and the plurality of back row seats include a back row left seat and a back row right seat, the in-vehicle conversation device comprising:

a front row sound collector provided at a position that is in front of and between the front row left seat and the front row right seat, and is configured to collect a sound produced by the passenger in the one of the plurality of front row seats;

a back row sound collector provided at a position that is in front of and between the back row left seat and the back row right seat, and is configured to collect a sound produced by the passenger in the one of the plurality of back row seats;

a plurality of outer speakers including:

a front row left seat speaker provided in or near a headrest of the front row left seat and more outward than a head position of a passenger in the front row left seat relative to the front row sound collector;

a front row right seat speaker provided in or near a headrest of the front row right seat and more outward than a head position of a passenger in the front row right seat relative to the front row sound collector;

a back row left seat speaker provided in or near a headrest of the back row left seat and more outward than a head position of a passenger in the back row left seat relative to the back row sound collector; and a back row right seat speaker provided in or near a headrest of the back row right seat and more outward than a head position of a passenger in the back row right seat relative to the back row sound collector;

a front row sound amplifier configured to amplify the sound collected by the front row sound collector and to output an amplified sound from the back row left seat speaker and from the back row right seat speaker;

a back row sound amplifier configured to amplify the sound collected by the back row sound collector and to output an amplified sound from the front row left seat speaker and from the front row right seat speaker; and a plurality of inner speakers, each provided in or near a headrest of each seat of the plurality of front row seats and the plurality of back row seats, more inward than a head position of a passenger relative to the front row sound collector or the rear row sound collector, wherein a first sound output corresponding to a sound collected by the front row sound collector and the back row sound collector is generated using only the plurality of outer speakers among the plurality of outer speakers and the plurality of inner speakers.

2. The in-vehicle conversation device according to claim 1, further comprising:

a passenger detector configured to detect presence or absence of a passenger in each seat of the front row seats and the back row seats; and an output stop controller configured to stop the sound output to one or more speakers among the front row left seat speaker, the front row right seat speaker, the back row left seat speaker, and the back row right seat speaker, the one or more speakers corresponding to seats in which no passenger is detected to be present by the passenger detector.

3. The in-vehicle conversation device according to claim 1, wherein a second sound output other than the first sound output is generated using both the plurality of outer speakers and the plurality of inner speakers.

* * * * *